United States Patent
Lin et al.

(10) Patent No.: US 7,585,079 B2
(45) Date of Patent: Sep. 8, 2009

(54) OPTICAL IMAGING METHOD AND PROJECTOR UTILIZING THE SAME

(75) Inventors: Lung-Ta Lin, Taipei County (TW); Ming-Kuen Lin, Yunlin County (TW); Tsang-Chi Wang, Tainan (TW)

(73) Assignee: Qisda Corporation, Taoyuan County (TW)

( * ) Notice: Subject to any disclaimer, the term of this patent is extended or adjusted under 35 U.S.C. 154(b) by 676 days.

(21) Appl. No.: 11/415,122

(22) Filed: May 2, 2006

(65) Prior Publication Data

US 2006/0262285 A1 Nov. 23, 2006

(30) Foreign Application Priority Data

May 3, 2005 (TW) .............................. 94114216 A

(51) Int. Cl.
*G03B 21/14* (2006.01)
(52) U.S. Cl. ............................ 353/102; 349/5; 353/121
(58) Field of Classification Search .................... 353/69, 353/102, 101; 348/742, 743, 771; 349/5, 349/7; 359/799, 809
See application file for complete search history.

(56) References Cited

U.S. PATENT DOCUMENTS

| 5,597,222 | A | * | 1/1997 | Doany et al. .................. 353/33 |
| 6,139,156 | A | * | 10/2000 | Okamori et al. ............... 353/98 |
| 6,260,974 | B1 | * | 7/2001 | Koyama ...................... 353/98 |
| 6,461,001 | B2 | * | 10/2002 | Okamori et al. ............. 353/102 |

FOREIGN PATENT DOCUMENTS

CN 1525207 A 9/2004

* cited by examiner

*Primary Examiner*—William C Dowling

(57) ABSTRACT

An imaging method. A light beam passes through a first lens set, a second lens set, an imaging device and a projection lens set. The light beam is focused in a first position. The focused light beam converges in a first relay position via the first lens set and in a second relay position via the second lens set. The optical path from the first position to the principal plane of the first lens set is defined as a first optical path, and the principal plane of the second lens set to the second relay position as the fourth optical path. The length of the first optical path is longer than twice the focal length of the first lens set, and the length of the fourth optical path is longer than twice the focal length of the second lens set.

17 Claims, 3 Drawing Sheets

OPTICAL IMAGING METHOD AND PROJECTOR UTILIZING THE SAME

BACKGROUND

The invention relates to an imaging method, and in particular to an imaging method projecting an image to a screen via two lens sets which have a minimal distance therebetween.

A light beam in a projector is converted to mono color light, such as red, blue or green light, via a color wheel. The mono color light passes through a series of optical lenses and is projected onto a digital micromirror device (DMD) which determines pixel positions of the mono light and reflects the mono light to a projection lens set which projects the light beam on a screen.

In a conventional projector, two lens sets are commonly used. The light beam passes through both lens sets and is projected onto the digital micromirror device. For the sake of reducing volume of the projector, an optical path between the two lens sets with a minimal length is desirable.

SUMMARY

An imaging method according to an embodiment of the invention comprises the following steps:

A light source, a first lens set, a second lens set, an imaging device and a projection lens set are provided.

A light beam from the light source is converged in a first position to be a light spot and passes through the first lens set, the second lens set, the imaging device and the projection lens set. The light spot is imaged in a first relay position via the first lens set and imaged in a second lens set via the second lens set. The converged light beam is projected on a screen via the imaging device and the projecting lens.

A first optical path along which the light beam travels from the first position to the principal plane of the first lens set is defined.

A second optical path along which the light beam travels from the principal plane of the first lens set to the first relay position is defined.

A third optical path along which the light beam travels from the first relay position to the principal plane of the second lens set is defined.

A fourth optical path along which the light beam travels from the principal plane of the second lens set to the second relay position is defined.

The length of the first optical path is set to be longer than twice the focal length of the first lens set, and the length of the fourth optical path is set to be longer than twice the focal length of the second lens set.

The imaging method further comprises the following steps: the light beam from the light source passes through a light integrator prior to the first lens set. The entrance of the light integrator is substantially in the first position.

The imaging device comprises a digital micro mirror device. The fourth optical path converges in the pupil of the projection lens set. The light beam uniformly covers the imaging device.

The first optical path can be longer than 30 mm and shorter than 60 mm, and the length of the fourth optical path can be longer than 60 mm and shorter than 100 mm.

BRIEF DESCRIPTION OF THE DRAWINGS

The invention can be more fully understood by reading the subsequent detailed description and examples with references made to the accompanying drawings, wherein.

DETAILED DESCRIPTION

Figure 1:
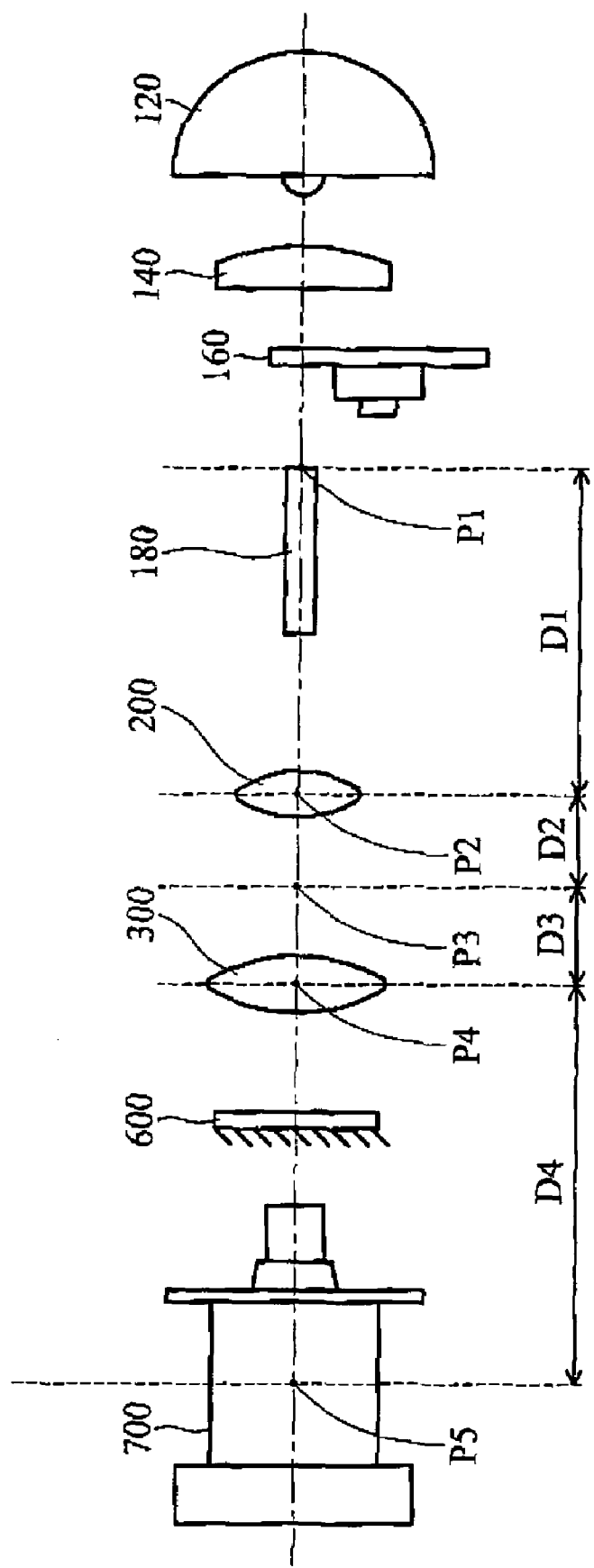
FIG. 1 is a schematic view of an imaging method of the invention.

Referring to FIG. 1, a light beam from a light source 120 is converged to a light spot by passes through a condenser 140. The converged light beam passing through a color wheel 160 to create mono color light, and the mono color light enters a light pipe (light integrator) 180. The light source 120 comprises an ellipsoid mirror and a bulb. Light from the bulb is reflected by the ellipsoid mirror to create a light beam. The light beam passes through the condenser 140 and converges in a first position P1 which is substantially at the entrance of the light pipe 180. The light beam escaping the light pipe 180 passes through a first lens set 200 which comprises at least one lens. In FIG. 1, only one lens symbol is used to represent the whole first lens set 200. The principal plane of the first lens set 200 is defined as P2. The light beam passing through the first lens set 200 is imaged in a first relay position P3. The light beam from P3 passes through a second lens set 300. Similarly, the second lens set 300 comprises at least one lens, and only one lens symbol is used to represent the whole second lens set 300. The principal plane of the second lens set 300 is defined as P4. The light beam passing through the second lens set 300 is imaged in a second relay position P5. In a projector application, the light beam passing through the second lens set 300 is reflected by a digital micromirror device 600 which determines pixel positions of the light beam and projects the light beam on a screen (not shown) via a projection lens set 700.

For the sake of clarity, the optical path from P1 to P2, which has a length D1 is referred to as a first optical path. The optical path from P2 to P3, which has a length D2, is referred to as a second optical path. The optical path from P3 to P4, which has a length D3, is referred to as a third optical path. The optical path from P4 to P5, which has a length D4, is referred to as a fourth optical path. In geometrical optics, when an object is placed at a point beyond twice the focal length from the principal plane, the image is formed between the focal point and the point of twice the focal length. When an object is placed between the focal point and the point of twice the focal length, the image is formed beyond the point of twice the focal length. A light beam passing through the light pipe 180 prior to the first lens set 200 seems to emit from P1 and converges at P3 and P5 via the first and second lens sets 200 and 300 respectively. To reduce the volume occupied by the optical system, a minimal distance between the first and second lens sets 200 and 300 is desirable. Employing the theorem of geometrical optics, D1 is set to be longer than twice the focal length of the first lens set 200, whereby the length of D2 is between the focal length and twice the focal length of the first lens set 200. D4 is set to be longer than twice the focal length of the second lens set 300, whereby D3 is between the focal length and twice the focal length of the second lens set 300. The length of D1 and D4, however, cannot be unlimited, and are dependent on the space supplied by the device.

According to the method of the invention, D2+D3 is limited between the sum of the focal lengths of the first and second lens set 200 and 300 and the sum of twice the focal length of the first and second lens set 200 and 300. That is (F1+F2)< (D2+D3)<2(F1+F2), wherein F1 is the focal length of the first lens set 200, and F2 is the focal length of the second lens set 300.

Figure 2:
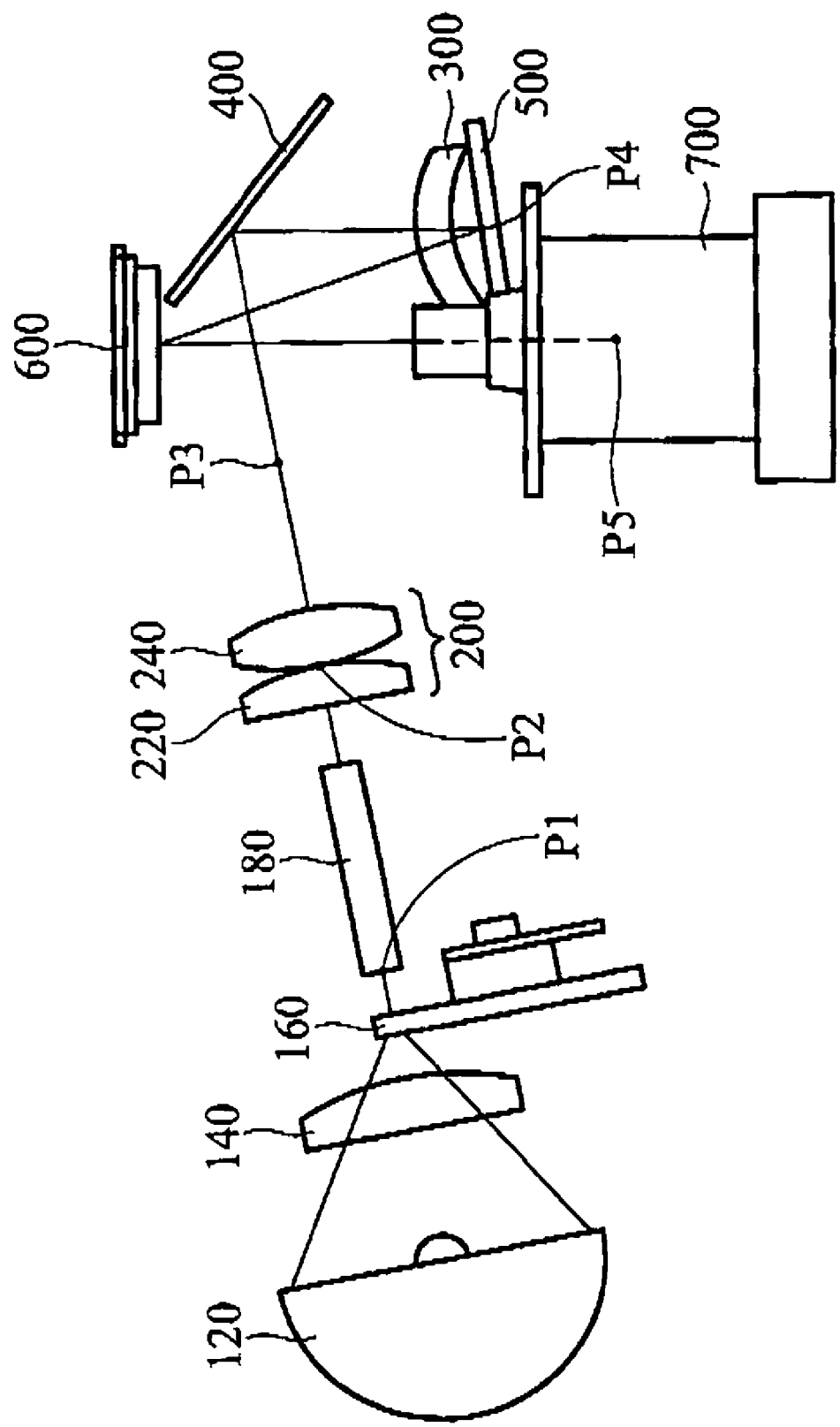
FIG. 2 is a schematic view of a projector employing the imaging method of the invention.
Figure 3:
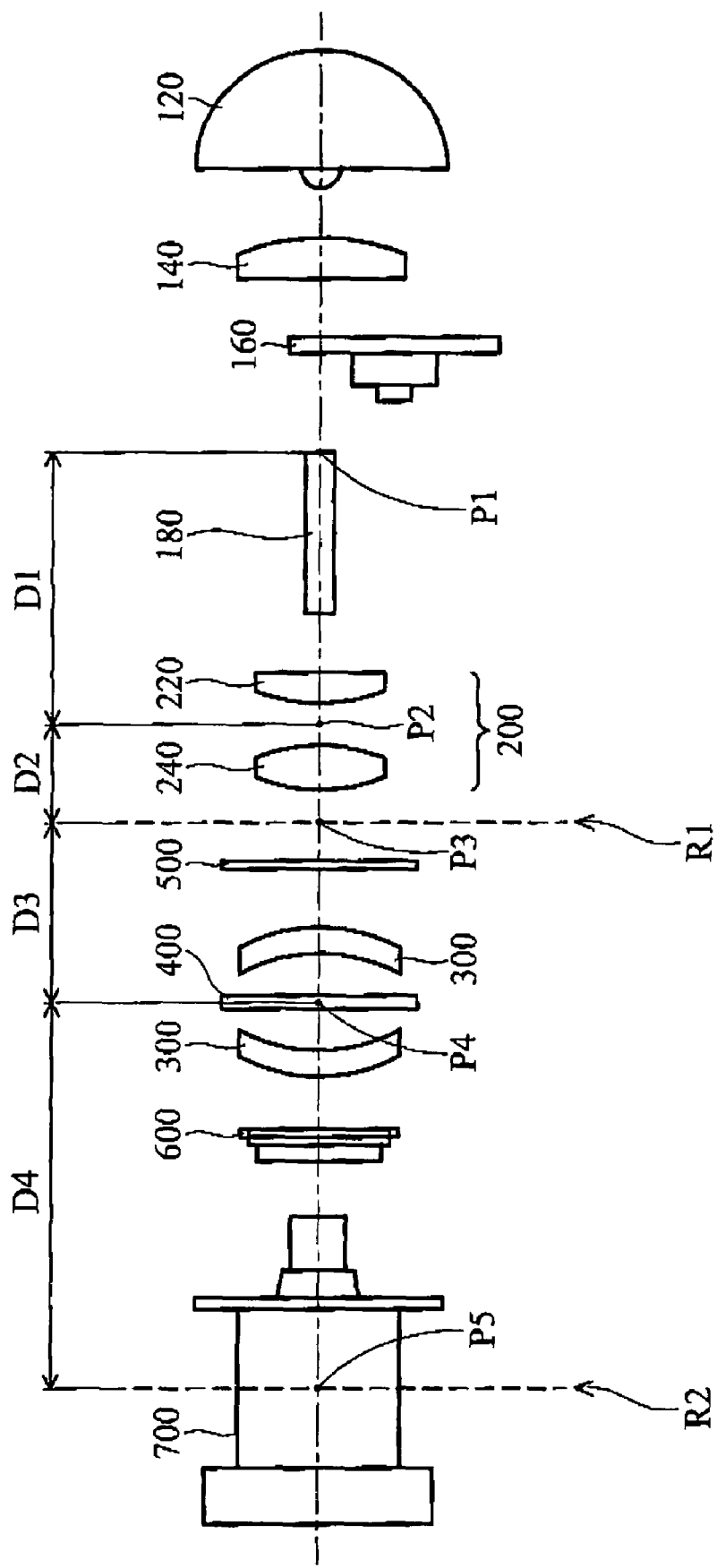
FIG. 3 is a developed diagram of all optical elements of FIG. 2.

An embodiment of the imaging method is described in the following. Referring to FIGS. 2 and 3, the first lens set 200 comprises a first lens 220 and a second lens 240. Although the second lens set comprises only one third lens 300, the light beam is directed to pass through the third lens 300 twice. In FIG. 3, the third lens 300 are depicted twice.

Light beam from light source 120 passes through the condenser 140 and the color wheel 160 and enters the light pipe 180 via an entrance P1. The light beam passes the first lens 220 and the second lens 240 and converges in the first relay position P3. P2 is the principal plane of the first lens set 200. The light beam is reflected by a second mirror 400 to pass through the third lens 300. The light beam is reflected by a first mirror 500 to pass through the third lens 300 again and converge in the second relay position P5. Because the light beam passes through the third lens 300 twice, the principal plane P4 of the second lens set is located at the first mirror 500. The fourth optical path converges in the pupil of the projection lens set. The digital micromirror device 600 is placed between the second lens set 300 and the projection lens set 700 to determine pixel positions of the different mono color light to form an image. Preferably, the light beam precisely covers the digital micromirror device 600 to obtain optimal image brightness.

In this embodiment, the first optical path length D1 is longer than 30 mm and shorter than 60 mm, and the fourth optical path length D4 is longer than 60 mm and shorter than 100 mm.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical imaging method, comprising the following steps:
   providing a light source, a first lens set, a second lens set, an imaging device and a projection lens set;
   converging a light beam from the light source to be a light spot in a first position to pass through the first lens set, the second lens set, the imaging device and the projection lens set, wherein the light spot is imaged in a first relay position via the first lens set and is imaged in a second lens set via the second lens set, the converged light beam is projected on a screen via the imaging device and the projecting lens;
   defining a first optical path along which the light beam travels from the first position to the principal plane of the first lens set;
   defining a second optical path along which the light beam travels from the principal plane of the first lens set to the first relay position;
   defining a third optical path along which the light beam travels from the first relay position to the principal plane of the second lens set;
   defining a fourth optical path along which the light beam travels from the principal plane of the second lens set to the second relay position;
   setting the length of the first optical path to be longer than twice the focal length of the first lens set; and
   setting the length of the fourth optical path to be longer than twice the focal length of the second lens set.

2. The imaging method as claimed in claim 1 further comprising the following steps: enabling the light beam from the light source to pass through a light integrator prior to the first lens set, wherein the entrance of the light integrator is substantially in the first position.

3. The imaging method as claimed in claim 1, wherein the imaging device comprises a digital micro mirror device.

4. The imaging method as claimed in claim 1, wherein the fourth optical path converges in the pupil of the projection lens set.

5. The imaging method as claimed in claim 1, wherein the light beam uniformly covers the imaging device.

6. The imaging method as claimed in claim 1, wherein the length of the first optical path is longer than 30 mm and shorter than 60 mm.

7. The imaging method as claimed in claim 1, wherein the length of the fourth optical path is longer than 60 mm and shorter than 100 mm.

8. A projector, comprising:
   a light source;
   a first lens set;
   a second lens set;
   an imaging device; and
   a projection lens set, wherein a light beam from the light source converges to be a light spot in a first position and passes through the first lens set, the second lens set, the imaging device and the projection lens set sequentially, and the light spot is imaged in a first relay position via the first lens set and imaged in a second relay position via the second relay position, wherein the path length of the light beam traveling from the first position to the principal plane of the first lens set is longer than twice the focal length of the first lens set, and the path length of the light beam traveling from the principal plane of the second lens set to the second relay position is longer than twice the focal length of the second lens set.

9. The projector as claimed in claim 8 further comprising a light integrator, wherein the light beam from the light source passes through the light integrator prior to the first lens set, and the entrance of the light integrator is substantially in the first position.

10. The projector as claimed in claim 8, wherein the imaging device comprises a digital micro mirror device.

11. The projector as claimed in claim 8, wherein the optical path from the principal plane of the second lens set to the second relay position converges in the pupil of the projection lens set.

12. The projector as claimed in claim 8, wherein the light beam traveling from the principal plane of the second lens set to the second relay position precisely cover the imaging device.

13. The projector as claimed in claim 8, wherein the optical path length of the light beam traveling from the first position to the principal plane of the first lens set is longer than 30 mm and shorter than 60 mm.

14. The projector as claimed in claim 8, wherein the optical path length of the light beam traveling from the principal plane of the second lens set to the second relay position is longer than 60 mm and shorter than 100 mm.

15. The projector as claimed in claim 8, wherein the first lens set comprises a first lens and a second lens, and the light beam passes through the first lens and the second lens sequentially.

16. The projector as claimed in claim 15 further comprising a first mirror, wherein the second lens set comprises a third lens, and the light beam having passed through the first lens set passes through the third lens and is reflected by the first mirror to pass the third lens again, and arrives at the imaging device.

17. The projector as claimed in claim 16 further comprising a second mirror, wherein the light beam having passed through the first lens set is reflected by the second mirror to pass through the third lens.

* * * * *

UNITED STATES PATENT AND TRADEMARK OFFICE
CERTIFICATE OF CORRECTION

| | | |
|---|---|---|
| PATENT NO. | : 7,585,079 B2 | Page 1 of 1 |
| APPLICATION NO. | : 11/415122 | |
| DATED | : September 8, 2009 | |
| INVENTOR(S) | : Lin et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 799 days.

Signed and Sealed this

Fourteenth Day of September, 2010

David J. Kappos
*Director of the United States Patent and Trademark Office*